(12) United States Patent
Lv

(10) Patent No.: US 9,852,168 B2
(45) Date of Patent: Dec. 26, 2017

(54) DATA STORAGE PLANNING

(71) Applicant: Zhejiang Uniview Technologies Co., Ltd, Hangzhou (CN)

(72) Inventor: Zhiming Lv, HangZhou (CN)

(73) Assignee: Zhejiang Uniview Technologies Co., Ltd, Hangzhou (CN)

( * ) Notice: Subject to any disclaimer, the term of this patent is extended or adjusted under 35 U.S.C. 154(b) by 361 days.

(21) Appl. No.: 14/402,103

(22) PCT Filed: Dec. 12, 2013

(86) PCT No.: PCT/CN2013/089235
§ 371 (c)(1),
(2) Date: Nov. 18, 2014

(87) PCT Pub. No.: WO2014/094568
PCT Pub. Date: Jun. 26, 2014

(65) Prior Publication Data
US 2015/0149476 A1    May 28, 2015

(30) Foreign Application Priority Data

Dec. 21, 2012 (CN) .......................... 2012 1 0563212

(51) Int. Cl.
*G06F 17/30* (2006.01)
*G06F 3/06* (2006.01)
(52) U.S. Cl.
CPC ........ *G06F 17/30321* (2013.01); *G06F 3/061* (2013.01); *G06F 3/067* (2013.01); *G06F 3/0614* (2013.01); *G06F 3/0635* (2013.01); *G06F 3/0644* (2013.01)

(58) Field of Classification Search
None
See application file for complete search history.

(56) References Cited

U.S. PATENT DOCUMENTS

| 8,966,191 B2 * | 2/2015 | Flynn | G06F 3/061 |
| | | | 711/154 |
| 2006/0265358 A1 * | 11/2006 | Hara | G06F 17/30197 |

FOREIGN PATENT DOCUMENTS

| CN | 1653455 A | 8/2005 |
| CN | 1963814 A | 5/2007 |
| CN | 101231649 B | 7/2008 |
| CN | 101567003 A | 10/2009 |

(Continued)

*Primary Examiner* — Hosain Alam
*Assistant Examiner* — Tuan-Khanh Phan
(74) *Attorney, Agent, or Firm* — McCoy Russell LLP

(57) ABSTRACT

A planning device and method of data storage are disclosed. The planning device includes a format-processing sub-logic and a space-allocation sub-logic. The format-processing sub-logic is for creating a formatting information area, for creating an index area for storing index data, and for creating a data area on a designated physical storage disk, and wherein the formatting information defines the index area and the data area. The space-allocation sub-logic is for allocating at least one data block to an upper-layer application in accordance with a size of a document needed to be stored. By adopting the formatting process, users may create the index area and data area on different physical storage disks so as to separate the index area and the data area. In this way, the users may store the information regarding the index area on different storage disks.

2 Claims, 1 Drawing Sheet

(56) References Cited

FOREIGN PATENT DOCUMENTS

| | | | |
|---|---|---|---|
| CN | 101763490 | A | 6/2010 |
| CN | 101976181 | A | 2/2011 |
| CN | 101997918 | B | 3/2011 |
| WO | 2008097097 | A | 8/2008 |

* cited by examiner

DATA STORAGE PLANNING

CROSS REFERENCE

The present application is a U.S. National Phase of International Application No. PCT/CN2013/089235, filed on Dec. 12, 2013, which claims priority to Chinese Patent Application No. 2012105632121, filed with the Chinese Patent Office on Dec. 21, 2012, the entire contents of each of which are hereby incorporated by reference for all purposes.

BACKGROUND OF THE INVENTION

1. Field of the Invention

The present disclosure relates to network storage technology, and more particularly to a planning method and device on network data storage apparatuses.

2. Discussion of the Related Art

Within video surveillance storage field, various businesses have to be supported by document systems, which may be easily accomplished by resource sharing storages so as to enhance the utilization of storage space. NAS is a currently developed technology for supporting document sharing within a plurality of devices within the surveillance operations. However, bottleneck and instability of NAS storages have been exposed due to the trend of high definition cameras. Though NAS technology may be accomplished with a lower cost, but NAS technology may not be feasible enough for data storages with a huge amount of data.

No matter SAN or NAS is adopted, currently, most of solutions are accomplished by the document systems. In order to meet the general requirement of storage usage, the structure of the document system is complex. The storage performance may be lowered down and the system may be instable due to repeatedly Overwrite-on-Full operations for a long time period. Also, it needs a certain amount of time to recover when an index area causing a suspension of surveillance operations even if a backup mechanism exists. Thus, it is needed to enhance the reliability of the surveillance system where a large amount of data are stored.

SUMMARY OF THE INVENTION

The object of the invention is to provide a planning method and device of data storage for network storage apparatuses.

In one aspect, the planning device (also called "planning logic") includes a format-processing sub-logic and a space-allocation sub-logic. The format-processing sub-logic is for creating a formatting information area, for creating an index area for storing index data, and for creating a data area on a designated physical storage disk, and wherein the formatting information defines the index area and the data area. The space-allocation sub-logic is for allocating at least one data block to an upper-layer application in accordance with the size of a document needed to be stored.

In another aspect, a planning method of data storage for network storage apparatuses includes: creating a formatting information area, creating an index area for storing index data on designated physical storage disk, and creating a data area on a designated physical storage disk, and wherein the formatting information defines the index area and the data area; and allocating at least one data block to an upper-layer application in accordance with the size of a document needed to be stored.

By adopting the formatting process, users may create the index area and data area on different physical storage disks so as to separate the index area and the data area. In this way, the users may store the information regarding the index area on different storage disks. For instance, the physical storage disks with better performance, such as a local SSD disk, may be utilized to save the index area so as to enhance the accesses toward the index area.

DETAILED DESCRIPTION OF THE EMBODIMENTS

Embodiments of the invention will now be described more fully hereinafter with reference to the accompanying drawings, in which embodiments of the invention are shown.

The claimed invention relates to a data storage method for the SAN technology. In one embodiment, a data storage planning logic may be adopted on the network storage apparatuses. The network storage apparatuses include local physical storage devices, such as local disks, and at least one physical mounted storage devices, such as RAIDs. The local physical storage disks are for storing an operating system and storage software for the network storage apparatuses. The mounted local disks are for storing a huge amount of data from user hosts. The network storage apparatuses may include a control host, also called as a storage controller. The storage controller may include components such as a CPU and a memory. The local physical storage disks may be local disks or disk arrays within the storage controller. The mounted physical storage disks mainly connect to backend ports of the storage controller via a variety of extended connection technology, such as SAS.

Figure 1:
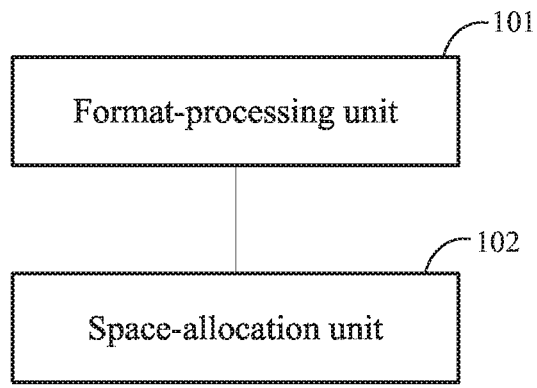
FIG. 1 is a schematic view of the data storage planning device in accordance with one embodiment.

Referring to FIG. 1, the data storage planning logic includes a format-processing sub-logic and a space-allocation sub-logic unit. The detailed process executed on the network storage apparatus by the data storage planning logic will be described hereinafter.

At block 101, the format-processing sub-logic creates a formatting information area, creates an index area for storing index data on a physical storage disk designated by users, and creates a data area on the physical storage disk designated by the users when being initialized. The size of the index area corresponds to the data area. The data area includes a plurality of data blocks with the same size.

At block 102, the space-allocation sub-logic allocates at least one data block to an upper-layer application according to the size of the document needed to be stored.

During initialization, the format-processing sub-logic provides an user management interface such that the users may designate parameters during the initialization process and may designate the allocation of the physical storage disks. The parameters for the initialization process determine operation parameters, such as the size of the index area and the data area, the size of data blocks. The size of the index area corresponds to the size of the data area. For instance, the size of the index area may be around 3 percent of that of the data area. In one embodiment, the users may designate a storage location of the index area during a formatting process, that is, the index area is stored on which physical storage disk. The users may also designate the storage location of the data area, which is different from conventional solutions in which the index area and the data area are fixedly stored on one physical storage disk.

As such, the physical storage disks may be feasibly allocated for the index area so as to enhance the overall performance. Also, the index area and the data area may be stored on different physical storage disks in accordance with users configuration. By separating the index area and the data area, it is more feasible to adopt the reliable physical storage disk, such as RAID1, to store the index area so as to ensure such critical information may be stably stored.

In addition, as to the index area, the physical storage disks may be local disks or local RAID of the network storage apparatus. It is more efficient to selecting the local physical storage disks to store the index area.

As it is predictable that the accesses toward the index area are quite random, adopting a buffer cannot contribute to the performance of such accesses. Thus, it is not needed to occupy the buffering resources on the network storage apparatus as the local disks have been adopted. In one embodiment, as the index area and the data area may be respectively arranged on different physical storage disks, the network storage apparatus may allocate a larger buffer for the accesses toward the data area.

Figure 2:
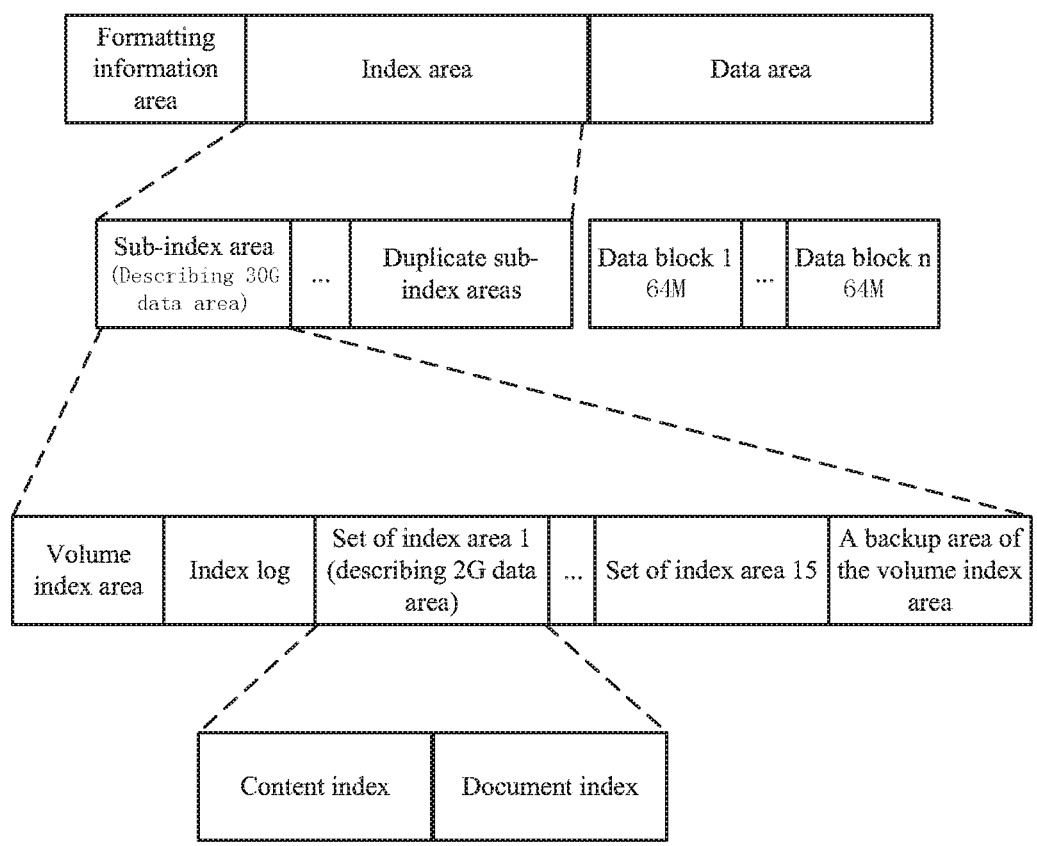
FIG. 2 is a schematic view of the data structure in accordance with one embodiment.

Referring to FIG. 2, the formatting information area defines the storage structure depicted in FIG. 2. The formatting information may define the size of the index area, the size of the data area, and the size of the data blocks. In one embodiment, the index area includes a plurality of sub-index areas with the same size, wherein one sub-index area is a primary one, and other sub-index areas are duplicate areas. This contributes to the reliability of the data stored within the index area, and prevents the index area from unable to recover due to damages. It is to be noted that the index area may include only the primary sub-index area. That is to say, the duplicate sub-index areas may not exist. In other embodiments, the index area may include a plurality of sub-index areas for respectively defining different data areas. For instance, the first sub-index area defines a first data area with the size around 30 GB, and the second sub-index area defines a second data area with the size around 30 GB, and so on.

Each sub-index area include a volume index area, an index log, a plurality of sets of index area and a backup area of the volume index area. The volume index area is for defining the information regarding the data blocks to be allocated in the data area. In one example, the index area includes two sub-index areas. The first sub-index area defines the first data area with the size around 30 G, and the second sub-index area defines the second data area with the size around 30 G The volume indexes of the first and the second sub-index areas are the same, which both define the information regarding the data blocks to be allocated in the data area with size around 60 G.

The volume indexes within different sub-index areas are utilized to define the data blocks to be allocated within the data area. First, the information regarding the data blocks to be allocated within the data area may be loaded into the memory at one time. By centrally managing the information, the accessing speed toward the index information may be enhanced and the number of accesses toward the disks may be lowered down. In addition, all of the data blocks are numbered accordingly, which not only simplifies the management, but also ensure that the data blocks may be allocated consecutively. By duplicating the volume index, the reliability of the system is enhanced for the reason that the critical information are backed up. The index log is for logging operational records regarding the index area. The sets of the index area define a data area with a predetermined size. The sets of the index area includes a content index and a document index. In an example, a sub-index area defines a data area with the size around 30 G. The sub-index area includes 15 sets of index area, wherein one set of index area defines one data area with 2 G capacity. The content index of the set of index area mainly includes the information defining the data blocks that have been occupied by the content within the 2 G capacity. The document index of the set of index area mainly relates to the information defining the data blocks that have been occupied by the documents within the 2 G capacity.

The context and the document are named in accordance with the stored information. The backup area of the volume index area prevents the index data from being inaccessible due to failed disc tracks. Preferably, the volume index area is located in a beginning location of the sub-index area. The backup area of the volume index area is located in an ending location of the sub-index area. The volume index area and the backup area of the volume index area are arranged to be far away from each other so as to prevent the volume index area and the backup area of the volume index area from being damaged due to one failed disc tracks. The backup volume index data within the backup area of the volume index area may still be accessible even though the disc tracks where the volume index is located fails. In this way, the disks are still accessible. In addition, as the backup area of the volume index area is located adjacent to the volume index area of the adjacent sub-index area, the backup area of the volume index area may be adopted to replace the volume index area of the adjacent sub-index area when the volume index area of the adjacent sub-index area is damaged. As such, it is ensured the volume index areas are spaced apart from each other for a substantially the same distance. Each sub-index area includes the volume index area. All of the volume index areas include the same information. Thus, it is not necessary to activate the backup area of the volume index area when there a great number of sub-index areas. However, it can be understood that the backup area of the volume index area has to be activated when the number of the sub-index areas is less than a threshold value N. That is, the same information is recorded within the backup area of the volume index area and the volume index area.

Preferably, the data area defined by one set of index area is not less than 2 G. It is because, usually, the size of the document has to be within 2 G. In this way, the index data of one set of index area is capable of defining the storing location of the at least one document. The space of the data area is allocated in a unit of the data block. It can be understood that the storing request of upper-layer applications usually comes from user terminals. The space-allocation sub-logic allocates enough data areas for the upper-layer applications. The above user terminals relate to devices requesting storage space, such as servers or monitoring terminals.

Preferably, the size of the data block, i.e., 32M or 64M, is much larger than the data blocks of the system itself, i.e., 4K, and the size of the data block is configured during initialization. Preferably, one parameter indicates a minimal size of the data block. That is, the size of the data block has to be configured to be larger than the minimal size. The minimal size, i.e., 32M, is larger than the size of the data block of the network storage apparatus. The discs fragments can be minimized by configuring the size of the data blocks to be much larger than that of the system data block. In addition, such configuration contributes to system performance, especially for video information within the surveillance environment. By selecting the data blocks with larger size, the space allocation process may be easier and may be conducted in an efficient way.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A non-transitory computer readable storage medium on which is stored machine readable instructions that when executed by a processor cause the processor to:

create a formatting information area, create an index area for storing index data, and create a data area on one or more designated physical storage disks;

allocate at least one data block to an upper-layer application in accordance with a size of a document needed to be stored;

wherein formatting information in the formatting information area defines the index area and the data area, where the index area includes a sub-index area and at least one duplicate area of the sub-index area, where the data area includes a plurality of data blocks with a same size, and where the index area and the data area are stored on different physical storage disks;

wherein the sub-index area comprises a volume index area, a plurality of sets of index areas, and a backup area of the volume index area;

wherein the volume index area is located in a beginning location of the sub-index area, and the backup area of the volume index area is located in an ending location of the sub-index area; and wherein the index area comprises M number of sub-index areas, the backup area of the volume index area is located adjacent to a volume index area of an adjacent sub-index area, the backup area of the volume index area is activated when M is less than a predetermined threshold value N or when the volume index area of the adjacent sub-index area is damaged.

2. A planning method of data storage for network storage apparatuses, comprising:

creating a formatting information area, creating an index area for storing index data on a designated physical storage disk;

creating a data area on another designated physical storage disk;

allocating at least one data block to an upper-layer application in accordance with a size of a document needed to be stored;

wherein formatting information in the formatting information area defines the index area and the data area, where the index area includes a sub-index area and at least one duplicate area of the sub-index area, and where the data area includes a plurality of data blocks with a same size, where the index area and the data area are stored on different physical storage disks;

wherein the sub-index area comprises a volume index area, a plurality of sets of index areas, and a backup area of the volume index area;

wherein the volume index area is located in a beginning location of the sub-index area, and the backup area of the volume index area is located in an ending location of the sub-index area; and wherein the index area comprises M number of sub-index areas, the backup area of the volume index area is located adjacent to a volume index area of an adjacent sub-index area, the backup area of the volume index area is activated when M is less than a predetermined threshold value N or when the volume index area of the adjacent sub-index area is damaged.

* * * * *